(12) United States Patent
Decesaris et al.

(10) Patent No.: US 8,959,380 B2
(45) Date of Patent: Feb. 17, 2015

(54) DYNAMICALLY OPTIMIZING BUS FREQUENCY OF AN INTER-INTEGRATED CIRCUIT ('I²C') BUS

(75) Inventors: Michael Decesaris, Carrboro, NC (US);
Steven C. Jacobson, Mebane, NC (US);
Luke D. Remis, Raleigh, NC (US);
Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 371 days.

(21) Appl. No.: 13/467,332

(22) Filed: May 9, 2012

(65) Prior Publication Data

US 2013/0304954 A1 Nov. 14, 2013

(51) Int. Cl.
*G06F 1/08* (2006.01)

(52) U.S. Cl.
USPC .......................................................... 713/503

(58) Field of Classification Search
CPC .................................. G06F 1/08; H04L 7/00
USPC .......................................... 713/503; 710/110
See application file for complete search history.

(56) References Cited

U.S. PATENT DOCUMENTS

| | | | | |
|---|---|---|---|---|
| 3,519,849 | A * | 7/1970 | Tyler | 327/37 |
| 4,421,995 | A * | 12/1983 | Gottschalk | 327/74 |
| 6,377,640 | B2 | 4/2002 | Trans | |
| 6,404,248 | B1 | 6/2002 | Yoneda | |
| 7,403,584 | B2 * | 7/2008 | Koenenkamp | 375/371 |
| 7,535,933 | B2 | 5/2009 | Zerbe et al. | |
| 7,606,955 | B1 | 10/2009 | Falik et al. | |
| 7,643,954 | B2 | 1/2010 | Cleitus et al. | |
| 7,987,382 | B2 | 7/2011 | Badaroglu | |
| 8,370,536 | B2 * | 2/2013 | Bohm | 710/14 |
| 8,575,755 | B1 * | 11/2013 | Christman et al. | 257/773 |
| 2002/0172304 | A1 | 11/2002 | Saze et al. | |
| 2009/0049277 | A1 | 2/2009 | Muranishi | |
| 2010/0054383 | A1 * | 3/2010 | Mobin et al. | 375/371 |
| 2010/0117691 | A1 * | 5/2010 | Lory et al. | 327/141 |
| 2010/0122002 | A1 * | 5/2010 | Lory et al. | 710/110 |

FOREIGN PATENT DOCUMENTS

JP 2011009849 A * 1/2011

OTHER PUBLICATIONS

Disclosed Anonymously, (Aug. 2011), "Method for Bi-Directional Communication Using I2c Buses", IP.com Prior Art Database, 6 pp., IP.com, No. IPCOM000209388D.
Disclosed Anonymously, (Dec. 2004), "Method for a Low Offset Rise Time Measurement", IP.com Prior Art Database, 4 pp., Ip.com, No. IPCOM00033810D.
NXP Semiconductors, "I2C Maximum Clock Speed Calculator", www.nxp.com [online] Mar. 2009 [accessed online Apr. 16, 2012], pp. 1-27, URL: http://ics.nxp.com/support/documents/interface/pdf/i2c.clock.speed.calculator.pdf.

* cited by examiner

*Primary Examiner* — Paul R Myers
(74) *Attorney, Agent, or Firm* — Edward J. Lenart; Katherine S. Brown; Biggers Kennedy Lenart Spraggins LLP (57) ABSTRACT

Optimizing an I²C bus frequency, the bus including signal lines coupling a master and slave nodes, a signal line coupled to a rise time detection circuit monitoring a voltage of the signal line, the voltage alternating between a logic low and logic high, where optimizing the frequency includes: detecting, during a rise in the signal line, a first voltage, the first voltage being greater than the logic low voltage; starting a counter to increment once for each clock period of the circuit; detecting a second voltage on the signal line, the second voltage greater than the first and less than the logic high; stopping the counter; calculating, in dependence upon the clock period and the counter value, a rise time; determining whether the rise time is greater than a maximum threshold; and increasing the I²C bus frequency if the calculated rise time is greater than the maximum threshold.

18 Claims, 4 Drawing Sheets

DYNAMICALLY OPTIMIZING BUS FREQUENCY OF AN INTER-INTEGRATED CIRCUIT ('I²C') BUS

BACKGROUND OF THE INVENTION

1. Field of the Invention

The field of the invention is data processing, or, more specifically, methods, circuits, and products for dynamically optimizing bus frequency of an Inter-Integrated Circuit ('I²C') bus.

2. Description of Related Art

The Inter-Integrated Circuit ('I²C') data communications interface and protocol is used widely throughout computing and electronic systems for various reasons including the robustness and stability of the protocol. The protocol, however, does have a few limitations. Like most electrical interfaces, devices employing I²C may be required to meet certain signal-integrity metrics to operate properly. Most notably, in I²C, is the rise time which the bus must meet. Because the bus is an open drain bus, meaning no active drivers, loading the bus with more devices generates a design concern as the rise time of the bus will be adversely impacted. Designers are often trying to balance the need for bandwidth of the bus versus a required rise time, such as that defined in the I²C specification. Usually, one bus speed does not fit all applications. To date, there is no I²C capable of dynamically finding an optimal clock frequency, based on bus load.

SUMMARY OF THE INVENTION

Methods, circuits, and computer program products for dynamically optimizing bus frequency of an Inter-Integrated Circuit ('I²C') bus are disclosed in this specification. The bus includes a plurality of signal lines coupling a master node and one or more slave nodes for data communications. At least one of the signal lines is coupled to a rise time detection circuit. The rise time detection circuit is configured to monitor a voltage of the signal line, where the voltage alternates between a logic low voltage and a logic high voltage. The rise time detection circuit is also operatively coupled to the master node for adjusting frequency of the I²C bus. Dynamically optimizing bus frequency of an I²C bus in accordance with embodiments of the present invention includes: setting, by the rise time detection circuit, the I²C bus frequency to a predetermined frequency; detecting, by the rise time detection circuit, a first voltage on the signal line, the first voltage being greater than the logic low voltage; starting, by the rise time detection circuit responsive to the detection of the first voltage, an automatically incrementing counter, the counter incrementing once for each clock period of the rise time detection circuit; detecting, by the rise time detection circuit, a second voltage on the signal line, the second voltage greater than the first voltage and less than the logic high voltage; stopping, by the rise time detection circuit responsive to the detection of the second voltage, the automatically incrementing counter; calculating, in dependence upon the clock period of the rise time detection circuit and the value of the counter, a rise time for the signal line; determining, by the rise time detection circuit, whether the calculated rise time is greater than a predetermined maximum threshold; and if the calculated rise time is greater than the predetermined maximum threshold, increasing, by the rise time detection circuit through the master node, the I²C bus frequency.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
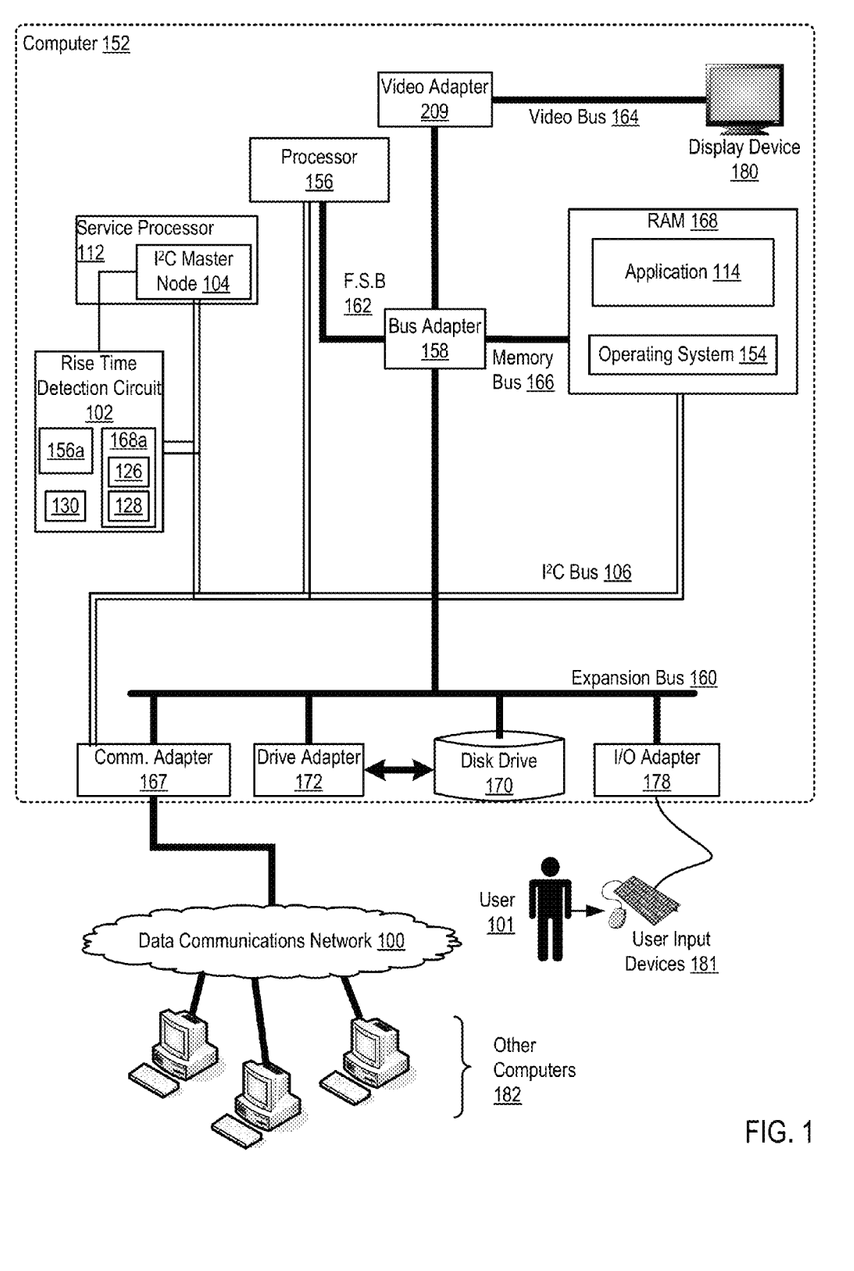
FIG. 1 sets forth a block diagram of a system for dynamically optimizing bus frequency of an I²C bus according to embodiments of the present invention.

Exemplary methods, apparatus, and products for dynamically optimizing bus frequency of an I²C bus in accordance with the present invention are described with reference to the accompanying drawings, beginning with FIG. 1. FIG. 1 sets forth a block diagram of a system for dynamically optimizing bus frequency of an I²C bus according to embodiments of the present invention. The system of FIG. 1 includes automated computing machinery comprising an exemplary computer (152) useful in dynamically optimizing bus frequency of an I²C bus according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer (152) of FIG. 1 also includes a service processor (112) coupled, through an I²C bus (106), to various components of the computer (152) including a data communications adapter (167), the processor (156), and RAM (168). An I²C bus is a multi-master serial single-ended computer bus that is typically used to attach low-speed peripherals to a motherboard, embedded system, mobile communications device, or other electronic device.

The example I²C bus (106) of FIG. 1 includes a plurality of signal lines coupling a master node (104) of the service processor (112) and one or more slave nodes (167, 156, 168) for data communications. At least one of the signal lines is coupled to a rise time detection circuit (102). The rise time detection circuit is configured to monitor a voltage of the I²C bus signal line. The voltage alternates between a logic low voltage and a logic high voltage. In some embodiments, the logic low value is 0 volts and the logic high value is 3.3 volts. In other embodiments, the logic low value is 0 volts and the logic high value is 5 volts. The rise time detection circuit (102) is also operatively coupled to the master node (104) for adjusting frequency of the I²C bus (106).

The rise time detection circuit (102) in the example of FIG. 1 includes a processor (156*a*) and computer memory (168*a*). Stored in computer memory (168*a*) is a bus frequency optimizer (126), a module of computer program instructions that when executed, causes the rise time detection circuit (102) to dynamically optimize bus frequency of the I²C bus (106) in accordance with embodiments of the present invention. The rise time detection circuit dynamically optimizes bus frequency of the I²C bus (106) in accordance with embodiments of the present invention by initially setting the I²C bus frequency to a predetermined frequency. The initial predetermined frequency may be an educated guess at a starting frequency, typically lower than the probably optimal frequency attained by the rise time detection circuit.

The rise time detection circuit (102) then detects, by, a first voltage on the signal line of the I²C bus. The first voltage has a greater value than the logic low voltage. In some embodiments, the first voltage is 0.7 volts. Responsive to the detection of the first voltage the rise time detection circuit (102) starts an automatically incrementing counter (130). The counter (130) increments once for each clock period of the rise time detection circuit (102). The rise time detection circuit (102) then detects a second voltage on the signal line. The second voltage is greater than the first voltage and less than the logic high voltage. In some embodiments the second voltage is 2 volts. Responsive to the detection of the second voltage, the rise time detection circuit (102) then stops the automatically incrementing counter. The rise time detection circuit then calculates a rise time for the signal line in dependence upon the clock period of the rise time detection circuit and the value of the counter. The rise time detection circuit (102) determines whether the calculated rise time is greater than a predetermined maximum threshold (128). If the calculated rise time is greater than the predetermined maximum threshold, the rise time detection circuit increases, through the master node (104), the I²C bus (106) frequency. The rise time detection circuit (102) may be configured to iteratively carry out this process until the calculated rise time is not greater than the predetermined maximum threshold. At that time, the rise time detection circuit has set the I²C bus (106) to an optimal bus frequency.

Although the rise time detection circuit (102) is depicted in the example of FIG. 1 as a type of microcontroller that includes a processor (156a) and memory (168), readers of skill in the art will recognize that the circuit (102) may be implemented in other forms. The rise time detection circuit (102) may, for example, be implemented as a field programmable gate array ('FPGA') programmed to perform dynamic optimization of the I²C bus frequency in accordance with embodiments of the present invention. The rise time detection (102) circuit may be coupled to the I²C bus (106) physically closer to one of the slave nodes than the master node or physically closer to the master node than the slave nodes.

Stored in RAM (168) is an application (114), a module of computer program instructions that carries out user-level data processing tasks. Examples of such applications may include server applications, web browsers, word processing applications, media library and playback applications, presentation applications, and so on as will occur to readers of skill in the art. Also stored in RAM (168) is an operating system (154). Operating systems useful in systems that dynamically optimize bus frequency of an I²C bus according to embodiments of the present invention include UNIX™ Linux™ Microsoft XP™, AIX™ IBM's i5/OS™, and others as will occur to those of skill in the art. The operating system (154) and application (114) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for dynamically optimizing bus frequency of an I²C bus according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically optimizing bus frequency of an I²C bus according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2A:
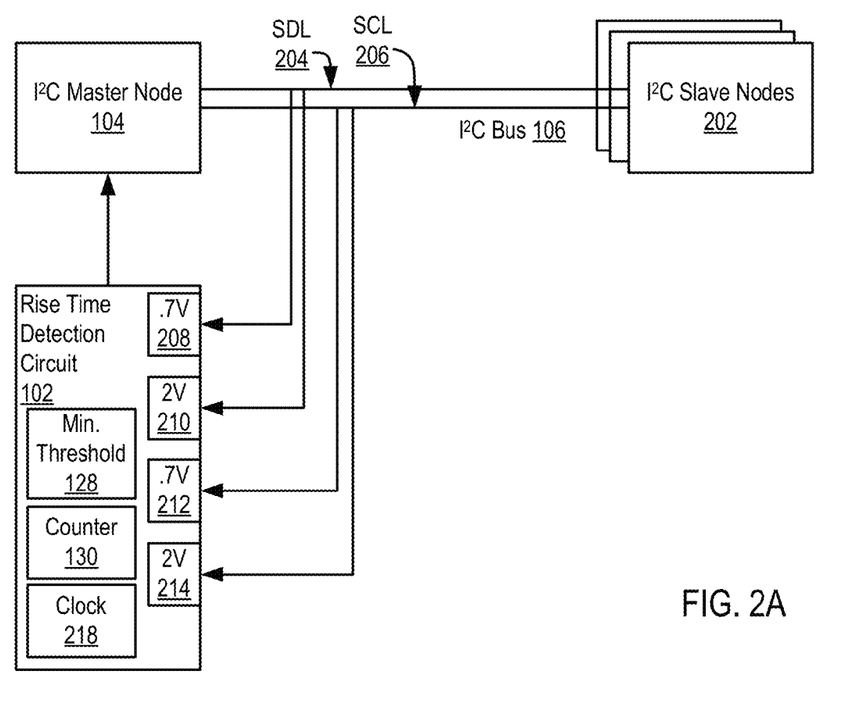
FIG. 2A sets forth a block diagram of another exemplary system for dynamically optimizing bus frequency of an I²C bus.

For further explanation, FIG. 2A sets forth a block diagram of another exemplary system for dynamically optimizing bus frequency of an I²C bus. The system of FIG. 2A includes an I²C master node (104), a plurality of I2C slave nodes (202), and a rise time detection circuit (102). The master node (104) is coupled for data communications to the slave nodes (202) by an I²C bus (106). The bus (106) includes a plurality of signal lines, including in this example a serial clock line ('SCL') (206) and a serial data line ('SDL') (204). At least one of the signal lines is coupled to the rise time detection circuit (102). In this example, the SDL (204) and SCL (206) are both coupled to the rise time detection circuit (102). The rise time detection circuit is configured to monitor a voltage of each signal line (204, 206). The voltage alternates between a logic low voltage (such as 0V) and a logic high voltage (such as 3.3V). The rise time detection circuit (102) is also operatively coupled to the master node for adjusting frequency of the I²C bus (106).

In the example of FIG. 2A, the rise time detection circuit (102) initially sets the I²C bus frequency to a predetermined frequency, such as 100 kilohertz (Khz). The rise time detection circuit (102) then detects a first voltage on a signal line, either the SDL (204) or the SCL (206). The first voltage is greater than the logic low voltage. The first voltage, for example, may be implemented as 0.7V. In the example of FIG. 2A, the rise time detection circuit (102) includes two inputs (208, 210, 212, 214) for each signal line. For each signal line, one input (208, 212) is configured to detect the first voltage (in this example, 0.7V) and another input is configured to detect a second voltage (in this example, 2V). In typical I²C protocol, the SDL and SCL will not rise at the same time, except in error conditions. As such, the rise time detection circuit will not—in normal operating conditions—detect the first voltage on both lines simultaneously.

Responsive to the detection of the first voltage, the rise time detection circuit (102) starts an automatically incrementing counter (130). The counter increments once for each clock (218) period of the rise time detection circuit. The period of the clock (218) of the rise time detection circuit (102) is less than the rise time of the I²C signal line.

The rise time detection circuit (102) then detects a second voltage (2V in this example) on the signal line (204 or 206). The second voltage is greater than the first voltage and less than the logic high voltage. Responsive to the detection of the second voltage, the rise time detection circuit (102) stops the automatically incrementing counter (130).

The rise time detection circuit (102) then calculates, in dependence upon the clock period of the rise time detection circuit and the value of the counter, a rise time for the signal line. The rise time detection circuit (102) may calculate such a rise time by calculating the product of the clock (218) period of the rise time detection circuit (102) and the value of the counter.

The rise time detection circuit (102) then determines whether the calculated rise time is greater than a predetermined maximum threshold (128). The predetermined maximum threshold represents a minimum acceptable rise time for an I²C signal. If the calculated rise time is greater than the predetermined maximum threshold, the rise time detection circuit (102) through the master node (104) increases the I²C bus frequency.

Figure 2B:
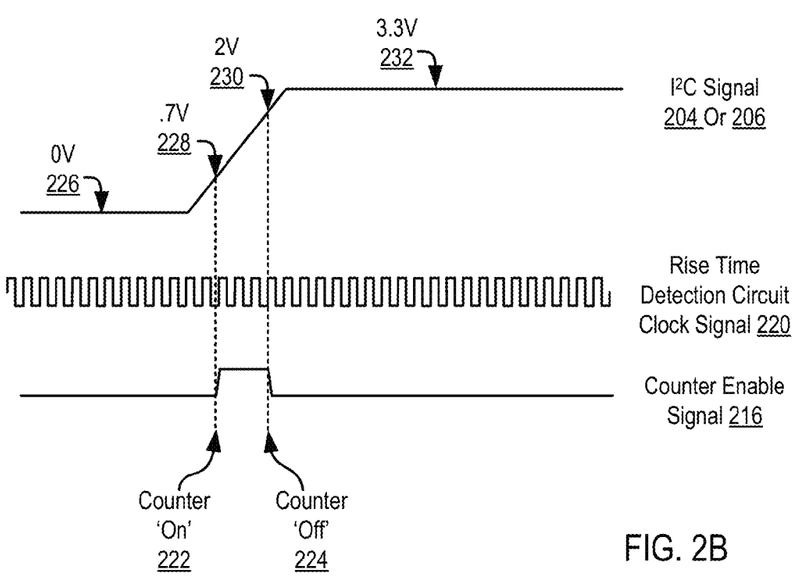
FIG. 2B sets forth an example signal timing diagram illustrating the signals in the example system of FIG. 2A.

For further explanation, FIG. 2B sets forth an example signal timing diagram illustrating the signals in the example system of FIG. 2A. The example timing diagram of FIG. 2B includes an I²C signal, either SDL (204) or SCL (206), the clock signal (220) of the clock (218 of FIG. 2A) rise time detection circuit (102) and an enable signal for the automatically incrementing counter (216).

In the example of FIG. 2B, the I²C signal (204, 206) is initially set, by the rise time detection circuit, to a predetermined I²C bus frequency, such as 100 Khz. As the I²C signal rises, the rise time detection circuit (102) detects a first voltage (228) of 0.7V on the signal line. Responsive to the detection of the first voltage (228), the rise time detection circuit (102) starts (222) an automatically incrementing counter (130) through use of the enable signal (216). The counter increments once for each clock signal (220) period of the rise time detection circuit (102).

As the I²C signal (204, 206) continues to rise, the rise time detection circuit (102) detects a second voltage (230) of 2V on the signal line. Responsive to the detection of the second voltage (230), the rise time detection circuit (102) stops (224) the automatically incrementing counter, again through use of the counter enable signal (216).

The rise time detection circuit (102) then calculates a rise time for the signal line (204, 206) in dependence upon the period of the clock signal (228) and the value of the counter. In the example of FIG. 2B, three periods of the rise time detection circuit clock signal (220) elapse during the time in which the counter is automatically incrementing. That is, the value of the counter is three. Consider, as an example, that the period of the clock signal is 10 nanoseconds (ns). In such an example, the rise time detection circuit may calculate a rise time of 30 ns (the counter value of 3 multiplied by 10 nanoseconds per clock period).

The rise time detection circuit (102) then determines whether the calculated rise time is greater than a predetermined maximum threshold. If the calculated rise time is greater than the predetermined maximum threshold, the rise time detection circuit (102) through the master node (104) increases the I²C bus frequency.

Figure 3:
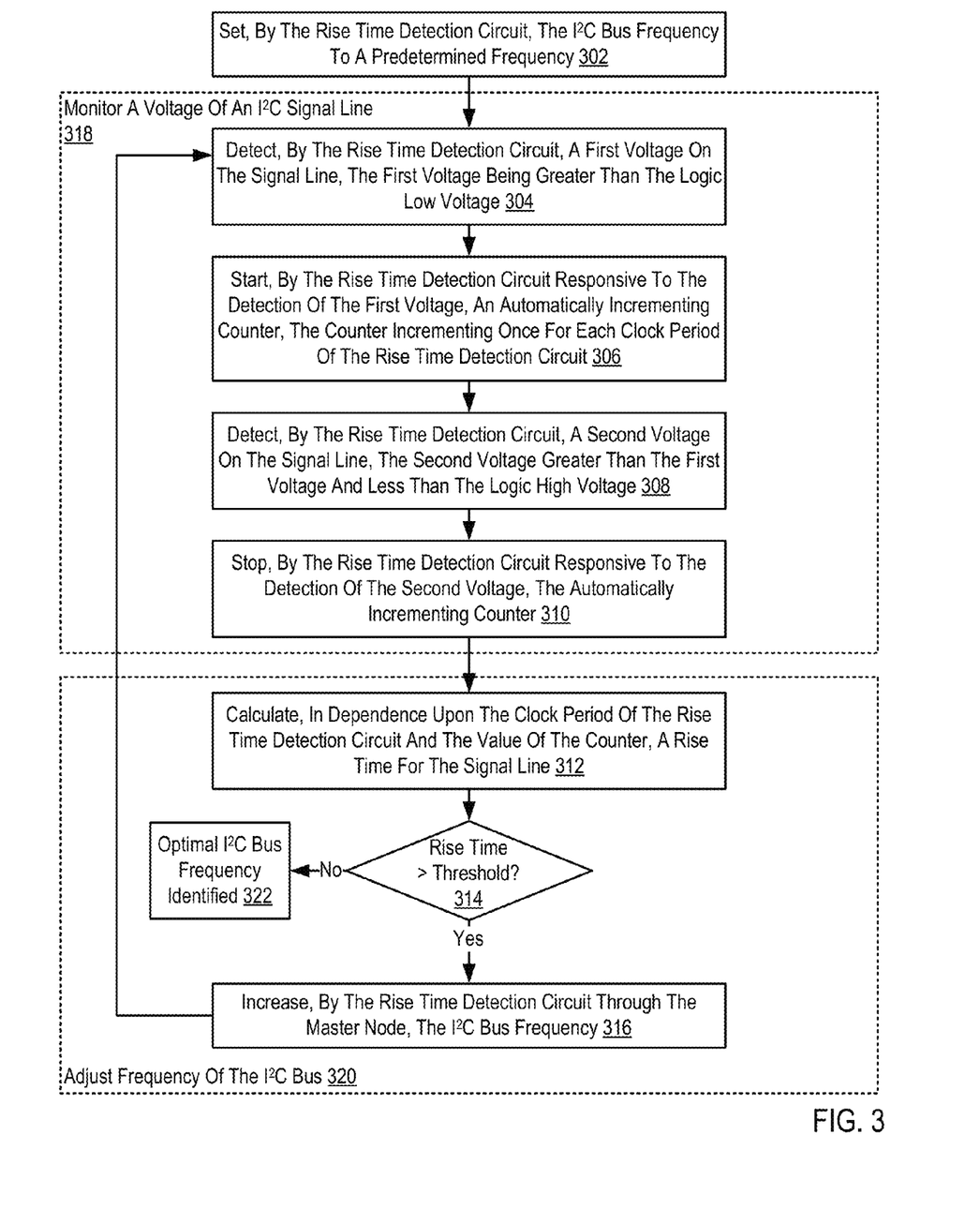
FIG. 3 sets forth a flow chart illustrating an exemplary method for dynamically optimizing bus frequency of an I²C bus according to embodiments of the present invention.

For further explanation, FIG. 3 sets forth a flow chart illustrating an exemplary method for dynamically optimizing bus frequency of an I²C bus according to embodiments of the present invention. The method of FIG. 3 is carried out in a system that includes an I²C bus similar to that of FIG. 2A, where the bus includes a plurality of signal lines coupling a master node and one or more slave nodes for data communications. At least one of the signal lines is coupled to a rise time detection circuit. The rise time detection circuit is configured to monitor (318) a voltage of the signal line. The voltage alternates between a logic low voltage and a logic high voltage. The rise time detection circuit is also operatively coupled to the master node for adjusting (320) frequency of the I²C bus.

The method of FIG. 3 includes setting (302), by the rise time detection circuit, the I²C bus frequency to a predetermined frequency. Setting (302) the I²C bus frequency to a predetermined frequency may be carried out in various ways including, for example, by setting the frequency to a known, but relatively low frequency.

The method of FIG. 3 also includes detecting (304), by the rise time detection circuit, a first voltage on the signal line. In the example method of FIG. 3, the first voltage is greater than the logic low voltage. Detecting (304) a first voltage on the signal line may be carried out in a variety of ways, including with comparators, FPGA I/O inputs with a reference voltage set to the first voltage, and in other ways as will occur to readers of skill in the art.

The method of FIG. 3 also includes starting (306), by the rise time detection circuit responsive to the detection of the first voltage, an automatically incrementing counter. In the example of FIG. 3, the counter increments once for each clock period of the rise time detection circuit. Starting (306) the automatically incrementing counter may be carried out in various ways including, for example, by applying an enable signal to the counter that is configured to start the counter.

The method of FIG. 3 also includes detecting (308), by the rise time detection circuit, a second voltage on the signal line. In the method of FIG. 3, the second voltage is greater than the first voltage and less than the logic high voltage. Detecting (308) the second voltage on the signal line may be carried out in a manner similar to detecting (304) a first voltage level as described above.

The method of FIG. 3 also includes stopping (310), by the rise time detection circuit responsive to the detection of the second voltage, the automatically incrementing counter. Stopping (310) the automatically incrementing counter may be carried out in various ways including, by removing (de-asserting) the enable signal on the counter.

The method of FIG. 3 also includes calculating (312), in dependence upon the clock period of the rise time detection circuit and the value of the counter, a rise time for the signal line. Calculating (312) a rise time for the signal line may be carried out by calculating the product of the clock period of the rise time detection circuit and the value of the counter The method of FIG. 3 also includes determining (314), by the rise time detection circuit, whether the calculated rise time is greater than a predetermined maximum threshold.

Determining (314) whether the calculated rise time is greater than a predetermined maximum threshold may be carried out by comparing the values of the calculated rise time and the predetermined maximum threshold. If the calculated rise time is not greater than the predetermined maximum threshold, then the optimal I$^2$C bus frequency has been identified (322) and set. If the calculated rise time is greater than the predetermined maximum threshold, the method of FIG. 3 continues by increasing (316), by the rise time detection circuit through the master node, the I$^2$C bus frequency.

In the method of FIG. 3, the steps of detecting (304) the first voltage on the signal line, starting (306) the automatically incrementing counter, detecting (308) the second voltage on the signal line, stopping (310) the automatically incrementing counter, calculating (312) the rise time, and determining (314) whether the calculated rise time is greater than the predetermined maximum threshold are carried iteratively, until the calculated rise time is not greater than the predetermined maximum threshold and an optimal I2C bus frequency is identified (322).

Figure 4:
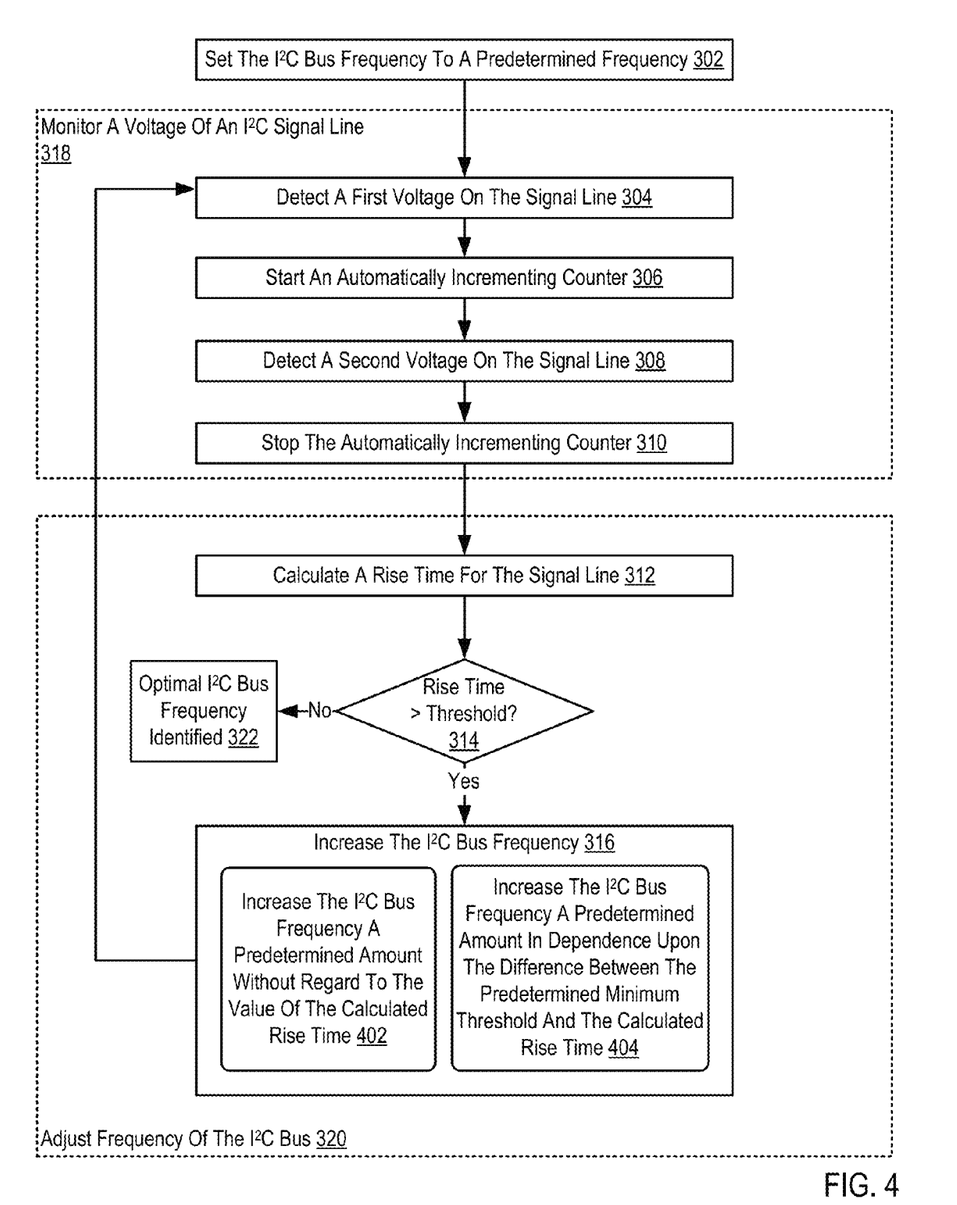
FIG. 4 sets forth a flow chart illustrating a further exemplary method for dynamically optimizing bus frequency of an I²C bus according to embodiments of the present invention.

For further explanation, FIG. 4 sets forth a flow chart illustrating a further exemplary method for dynamically optimizing bus frequency of an I$^2$C bus according to embodiments of the present invention. The method of FIG. 4 is similar to the method of FIG. 3 in that the method of FIG. 4 is also carried out in a system that includes I$^2$C bus having a plurality of signal lines coupling a master node and one or more slave nodes for data communications, at least one of the signal lines coupled to a rise time detection circuit, the rise time detection circuit configured to monitor (318) a voltage of the signal line, the voltage alternating between a logic low voltage and a logic high voltage, the rise time detection circuit operatively coupled to the master node for adjusting frequency of the I$^2$C bus. The method of FIG. 4 is also similar to the method of FIG. 3 in that the method of FIG. 4 includes: setting (302) the I$^2$C bus frequency to a predetermined frequency; detecting (304) a first voltage; starting (306) an automatically incrementing counter; detecting (308) a second voltage on the signal line; stopping (310) the automatically incrementing counter; calculating (312) a rise time; determining (314) whether the calculated rise time is greater than a predetermined maximum threshold; and increasing (316) the I$^2$C bus frequency if the calculated rise time is greater than the predetermined maximum threshold.

The method of FIG. 4 differs from the method of FIG. 3, however, in that the method of FIG. 4 includes two alternative embodiments of increasing (316) the I$^2$C bus frequency if the calculated rise time is greater than the predetermined maximum threshold. In one embodiment, increasing (316) the I$^2$C bus frequency is carried out by increasing (402) the I$^2$C bus frequency a predetermined amount without regard to the value of the calculated rise time. That is, the rise time detection circuit may be configured to increase the frequency a predetermined amount—say 1 Khz—no matter the calculated rise time. Consider, for example, that the predefined maximum threshold rise time is 20 ns. In such an example, the rise time detection circuit may increase the frequency of the I2C bus by 1 Khz regardless of whether the calculated rise time 50 ns or 100 ns.

In another embodiment, increasing (316) the I$^2$C bus frequency is carried out by increasing (404) the I$^2$C bus frequency a predetermined amount in dependence upon the difference between the calculated rise time and the predetermined maximum threshold. In this embodiment, for example, the rise time detection circuit may increase (404) the bus frequency 1 Khz when the difference between the calculated rise time and the predetermined maximum threshold falls within a range of 1-20 ns, 10 Khz when the difference between the calculated rise time and the predetermined maximum threshold falls within a range of 21-30 ns, and 40 Khz when the difference between the calculated rise time and the predetermined maximum threshold falls within a range of 31-60 ns.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically optimizing bus frequency of an Inter-Integrated Circuit ('I2C') bus, the bus comprising a plurality of signal lines coupling a master node and one or more slave nodes for data communications, at least one of the signal lines coupled to a rise time detection circuit, the rise time detection circuit configured to monitor a voltage of the signal line, the voltage alternating between a logic low voltage and a logic high voltage, the rise time detection circuit operatively coupled to the master node for adjusting frequency of the I2C bus, the method comprising:

setting, by the rise time detection circuit, the I2C bus frequency to a predetermined frequency; and iteratively until a calculated rise time is not less than a predetermined maximum threshold:

detecting, by the rise time detection circuit, a first voltage on the signal line, the first voltage being greater than the logic low voltage;

starting, by the rise time detection circuit responsive to the detection of the first voltage, an automatically incrementing counter, the counter incrementing once for each clock period of the rise time detection circuit;

detecting, by the rise time detection circuit, a second voltage on the signal line, the second voltage greater than the first voltage and less than the logic high voltage;

stopping, by the rise time detection circuit responsive to the detection of the second voltage, the automatically incrementing counter;

calculating, in dependence upon the clock period of the rise time detection circuit and the value of the counter, a rise time for the signal line;

determining, by the rise time detection circuit, whether the calculated rise time is greater than the predetermined maximum threshold; and if the calculated rise time is greater than the predetermined maximum threshold, increasing, by the rise time detection circuit through the master node, the I2C bus frequency.

2. The method of claim 1 wherein:

the plurality of signal lines of the I2C bus includes a serial clock line ('SCL'), the clock signal line coupled to the rise time detection circuit;

detecting the first voltage on the signal line further comprises detecting the first voltage on the SCL; and detecting the second voltage on the signal line further comprises detecting the second voltage on the SCL.

3. The method of claim 1 wherein:

the plurality of signal lines of the I2C bus includes a serial data line ('SDL'), the clock signal line coupled to the rise time detection circuit;

detecting the first voltage on the signal line further comprises detecting the first voltage on the SDL; and detecting the second voltage on the signal line further comprises detecting the second voltage on the SDL.

4. The method of claim 1 wherein:
calculating a rise time for the signal line further comprises calculating the product of the clock period of the rise time detection circuit and the value of the counter.

5. The method of claim 1 wherein:
increasing, by the rise time detection circuit through the master node, the I2C bus frequency further comprises increasing the I2C bus frequency a predetermined amount without regard to the value of the calculated rise time.

6. The method of claim 1 wherein:
increasing, by the rise time detection circuit through the master node, the I2C bus frequency further comprises increasing the I2C bus frequency a predetermined amount in dependence upon the difference between the calculated rise time and predetermined maximum threshold.

7. A rise time detection circuit for dynamically optimizing bus frequency of an Inter-Integrated Circuit ('I2C') bus, the bus comprising a plurality of signal lines coupling a master node and one or more slave nodes for data communications, at least one of the signal lines coupled to the rise time detection circuit, the rise time detection circuit also operatively coupled to the master node, the rise time detection circuit comprising a processor and computer memory operatively coupled to the processor, the computer memory having disposed within it computer program instructions that, when executed by the processor, cause the rise time detection circuit to carry out the steps of:
monitoring, by the rise time detection circuit, a voltage of the signal line coupled to the rise time detection circuit, the voltage alternating between a logic low voltage and a logic high voltage,
by the rise time detection circuit, the I2C bus frequency to a predetermined frequency; and iteratively until a calculated rise time is not less than a predetermined maximum threshold:
detecting, by the rise time detection circuit, a first voltage on the signal line, the first voltage being greater than the logic low voltage;
starting, by the rise time detection circuit responsive to the detection of the first voltage, an automatically incrementing counter, the counter incrementing once for each clock period of the rise time detection circuit;
detecting, by the rise time detection circuit, a second voltage on the signal line, the second voltage greater than the first voltage and less than the logic high voltage;
stopping, by the rise time detection circuit responsive to the detection of the second voltage, the automatically incrementing counter;
calculating, in dependence upon the clock period of the rise time detection circuit and the value of the counter, a rise time for the signal line;
determining, by the rise time detection circuit, whether the calculated rise time is greater than the predetermined maximum threshold; and
if the calculated rise time is greater than the predetermined maximum threshold, increasing, by the rise time detection circuit through the master node, the I2C bus frequency.

8. The rise time detection circuit of claim 7 wherein:
the plurality of signal lines of the I2C bus includes a serial clock line ('SCL'), the clock signal line coupled to the rise time detection circuit;
detecting the first voltage on the signal line further comprises detecting the first voltage on the SCL; and
detecting the second voltage on the signal line further comprises detecting the second voltage on the SCL.

9. The rise time detection circuit of claim 7 wherein:
the plurality of signal lines of the I2C bus includes a serial data line ('SDL'), the clock signal line coupled to the rise time detection circuit;
detecting the first voltage on the signal line further comprises detecting the first voltage on the SDL; and
detecting the second voltage on the signal line further comprises detecting the second voltage on the SDL.

10. The rise time detection circuit of claim 7 wherein:
calculating a rise time for the signal line further comprises calculating the product of the clock period of the rise time detection circuit and the value of the counter.

11. The rise time detection circuit of claim 7 wherein:
increasing, by the rise time detection circuit through the master node, the I2C bus frequency further comprises increasing the I2C bus frequency a predetermined amount without regard to the value of the calculated rise time.

12. The rise time detection circuit of claim 7 wherein:
increasing, by the rise time detection circuit through the master node, the I2C bus frequency further comprises increasing the I2C bus frequency a predetermined amount in dependence upon the difference between the calculated rise time and predetermined maximum threshold.

13. A computer program product for dynamically optimizing bus frequency of an Inter-Integrated Circuit ('I2C') bus, the bus comprising a plurality of signal lines coupling a master node and one or more slave nodes for data communications, at least one of the signal lines coupled to a rise time detection circuit, the rise time detection circuit configured to monitor a voltage of the signal line, the voltage alternating between a logic low voltage and a logic high voltage, the rise time detection circuit operatively coupled to the master node for adjusting frequency of the I2C bus, the computer program product disposed upon a computer readable medium, the computer program product comprising computer program instructions that, when executed, cause a computer to carry out the steps of:
setting, by the rise time detection circuit, the I2C bus frequency to a predetermined frequency; and iteratively until a calculated rise time is not less than a predetermined maximum threshold:
detecting, by the rise time detection circuit, a first voltage on the signal line, the first voltage being greater than the logic low voltage;
starting, by the rise time detection circuit responsive to the detection of the first voltage, an automatically incrementing counter, the counter incrementing once for each clock period of the rise time detection circuit;
detecting, by the rise time detection circuit, a second voltage on the signal line, the second voltage greater than the first voltage and less than the logic high voltage;
stopping, by the rise time detection circuit responsive to the detection of the second voltage, the automatically incrementing counter;
calculating, in dependence upon the clock period of the rise time detection circuit and the value of the counter, a rise time for the signal line;
determining, by the rise time detection circuit, whether the calculated rise time is greater than the predetermined maximum threshold; and if the calculated rise time is greater than the predetermined maximum threshold, increasing, by the rise time detection circuit through the master node, the I2C bus frequency.

14. The computer program product of claim 13 wherein:
the plurality of signal lines of the I2C bus includes a serial clock line ('SCL'), the clock signal line coupled to the rise time detection circuit;
detecting the first voltage on the signal line further comprises detecting the first voltage on the SCL; and
detecting the second voltage on the signal line further comprises detecting the second voltage on the SCL.

15. The computer program product of claim 13 wherein:
the plurality of signal lines of the I2C bus includes a serial data line ('SDL'), the clock signal line coupled to the rise time detection circuit;
detecting the first voltage on the signal line further comprises detecting the first voltage on the SDL; and
detecting the second voltage on the signal line further comprises detecting the second voltage on the SDL.

16. The computer program product of claim 13 wherein:
calculating a rise time for the signal line further comprises calculating the product of the clock period of the rise time detection circuit and the value of the counter.

17. The computer program product of claim 13 wherein:
increasing, by the rise time detection circuit through the master node, the I2C bus frequency further comprises increasing the I2C bus frequency a predetermined amount without regard to the value of the calculated rise time.

18. The computer program product of claim 13 wherein:
increasing, by the rise time detection circuit through the master node, the I2C bus frequency further comprises increasing the I2C bus frequency a predetermined amount in dependence upon the difference between the calculated rise time and predetermined maximum threshold.

* * * * *